United States Patent
Brulin et al.

(10) Patent No.: US 12,398,980 B2
(45) Date of Patent: Aug. 26, 2025

(54) CERAMIC ARMOR WITH CONTROLLED PORE SIZE DISPERSION

(71) Applicant: SAINT-GOBAIN CENTRE DE RECHERCHES ET D'ETUDES EUROPEEN, Corbevoie (FR)

(72) Inventors: Jerome Brulin, Williamsville, NY (US); Gilles Rossiquet, Louzac Saint-Andre (FR); Matthieu Graveleau, Avignon (FR)

(73) Assignee: SAINT-GOBAIN CENTRE DE RECHERCHES ET D'ETUDES EUROPEEN, Corbevoie (FR)

( * ) Notice: Subject to any disclaimer, the term of this patent is extended or adjusted under 35 U.S.C. 154(b) by 132 days.

(21) Appl. No.: 18/547,606

(22) PCT Filed: Feb. 4, 2022

(86) PCT No.: PCT/EP2022/052753
§ 371 (c)(1),
(2) Date: Aug. 23, 2023

(87) PCT Pub. No.: WO2022/179830
PCT Pub. Date: Sep. 1, 2022

(65) Prior Publication Data
US 2024/0133659 A1 Apr. 25, 2024
US 2024/0230281 A9 Jul. 11, 2024

(30) Foreign Application Priority Data
Feb. 23, 2021 (FR) .................................. 2101719

(51) Int. Cl.
*F41H 5/04* (2006.01)
*C04B 35/565* (2006.01)
(Continued)

(52) U.S. Cl.
CPC ......... *F41H 5/0414* (2013.01); *C04B 35/565* (2013.01); *C04B 35/64* (2013.01);
(Continued)

(58) Field of Classification Search
CPC .... F41H 5/0414; F41H 5/0421; F41H 5/0428; C04B 35/565; C04B 35/64; C04B 38/0054; C04B 38/0064; C04B 38/0067
See application file for complete search history.

(56) References Cited

U.S. PATENT DOCUMENTS

| 4,004,934 A | 1/1977 | Prochazka |
| 4,179,299 A | 12/1979 | Coppola et al. |

(Continued)

FOREIGN PATENT DOCUMENTS

| EP | 0034329 A1 | 8/1981 |
| EP | 0578408 A2 | 1/1994 |

(Continued)

OTHER PUBLICATIONS

International Search Report for PCT/EP2022/052753 dated May 27, 2022, 6 pages.

(Continued)

*Primary Examiner* — J. Woodrow Eldred
(74) *Attorney, Agent, or Firm* — Abel Schillinger, LLP; Adrian Lawrence

(57) ABSTRACT

Anti-ballistic armor element, comprising a ceramic body comprising a sintered material consisting of ceramic grains with a Vickers hardness of more than 5 GPa, the total pore volume of said material being between 0.5 and 10%, said ceramic body being characterized in that the cumulative volume of pores with a diameter of between 30 and 100 micrometers represents between 0.2 and 2.5% of the volume of said material, the cumulative volume of pores with a diameter of more than 100 micrometers is less than 0.2% of (Continued)

the volume of said material, the remainder of said total pore volume consisting of pores whose diameter is less than 30 micrometers.

20 Claims, 5 Drawing Sheets

(51) Int. Cl.
    *C04B 35/64*            (2006.01)
    *C04B 37/00*            (2006.01)
    *C04B 38/00*            (2006.01)
    *C04B 38/06*            (2006.01)

(52) U.S. Cl.
    CPC ........ *C04B 37/008* (2013.01); *C04B 38/0054* (2013.01); *C04B 38/0064* (2013.01); *C04B 38/067* (2013.01); *C04B 2235/3821* (2013.01); *C04B 2235/3826* (2013.01); *C04B 2235/786* (2013.01); *C04B 2237/02* (2013.01); *C04B 2237/365* (2013.01)

(56) References Cited

U.S. PATENT DOCUMENTS

| | | | |
|---|---|---|---|
| 4,415,632 | A | 11/1983 | Luhleich et al. |
| 4,604,249 | A | 8/1986 | Luhleich et al. |
| 5,834,387 | A | 11/1998 | Divakar et al. |
| 6,609,452 | B1 | 8/2003 | McCormick et al. |
| 6,762,140 | B2 | 7/2004 | Pujari et al. |
| 6,862,970 | B2 | 3/2005 | Aghajanian et al. |
| 9,321,691 | B2 | 4/2016 | Rossiquet et al. |
| 2007/0033912 | A1 | 2/2007 | Furukawa et al. |
| 2008/0227618 | A1 | 9/2008 | Horiuchi et al. |
| 2010/0004115 | A1 | 1/2010 | Ishimine et al. |
| 2012/0266543 | A1 | 10/2012 | Vedantham et al. |
| 2013/0231493 | A1* | 9/2013 | Shishkov ............... B01J 23/688 428/34.4 |
| 2017/0320782 | A1 | 11/2017 | Tierney |
| 2019/0322592 | A1* | 10/2019 | Adam ................ B01J 20/28011 |
| 2022/0349679 | A1 | 11/2022 | Tierney |
| 2023/0227371 | A1* | 7/2023 | Backhaus-Ricoult ....................... C04B 35/62695 264/631 |

FOREIGN PATENT DOCUMENTS

| | | |
|---|---|---|
| JP | 2005247622 A | 9/2005 |
| WO | 2007126784 A2 | 11/2007 |
| WO | 2009/102815 A2 | 8/2009 |
| WO | 2013186453 A1 | 12/2013 |
| WO | 2018136631 A2 | 7/2018 |
| WO | 2022179830 A1 | 9/2022 |
| WO | 2022183187 A1 | 9/2022 |

OTHER PUBLICATIONS

Sintered Silicon Carbide (SiC) Properties and Applications, Nov. 13, 2000 (Year: 2000), 4 pages.
Golias, N.A., & Dutton, R. W. "Delaunay Triangulation and 3D Adaptive Mesh Generation", Finite Elements in Analysis and Design, Apr. 1997, pp. 331-341, Colume 25, Issues 3-4, Elsevier.
International Search Report for PCT/US2022/070794, dated Jun. 10, 2022, 2 pages.
Hexoloy® SP SiC Material, Accessed Feb. 6, 2022, 4 pages <https://www.ceramicsrefractories.saint-gobain.com/products/hexoloy-sic-materials/grades/sp>.
Hexoloy SP Silicon Carbide, Technical Data, Carborundum, Copyright 2003 Saint-Gobain Ceramics, 4 pages, www.hexoloy.com.
Hexoloy SA Silicon Carbide, Technical Data, Copyright 2012 Saint-Gobain Ceramics, 4 pages, www.hexoloy.com.

\* cited by examiner

[Fig.5]
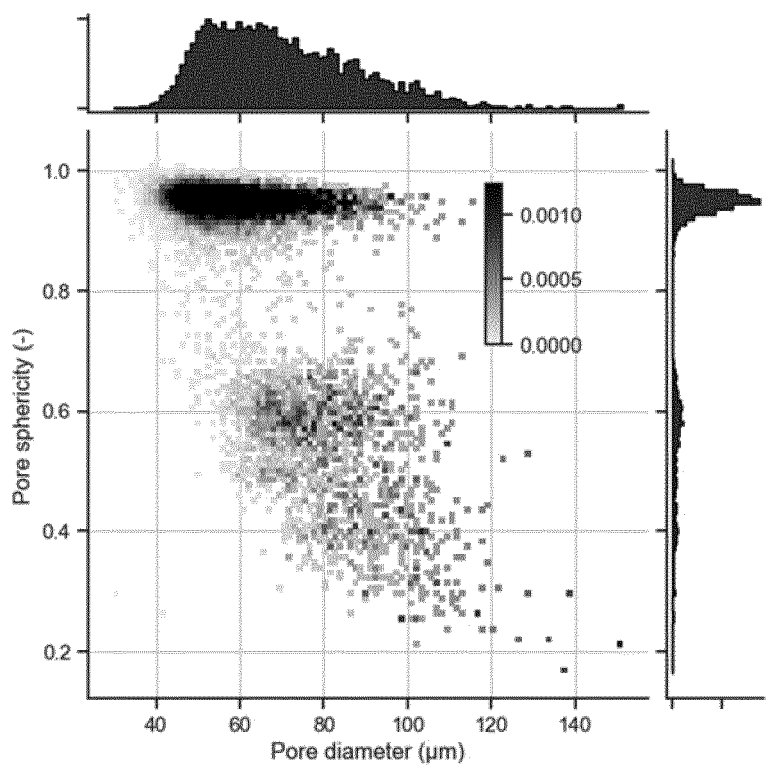

CERAMIC ARMOR WITH CONTROLLED PORE SIZE DISPERSION

CROSS-REFERENCE TO RELATED APPLICATIONS

This application is a National Stage entry under 35 U.S.C. § 371 of International Application No. PCT/EP2022/052753, filed Feb. 4, 2022, entitled "BLINDAGE CÉRAMIQUE A DISPERSION DE TAILLE DE PORES CONTRÔLÉE," by Jerome BRULIN, et al., which claims priority to French Patent Application No. 2101719, filed Feb. 23, 2021, entitled "BLINDAGE CERAMIQUE A DISPERSION DE TAILLE DE PORES CONTRÔLÉE," by Jerome BRULIN, et al., of which both applications are assigned to the current assignee hereof and incorporated herein by reference in their entireties.

The invention relates to a ceramic element which can be used as an element of armor or shielding that allows protecting people, vehicles (land, sea or air) or fixed installations (in particular buildings, perimeter walls, guardhouses).

In particular, the additional weight of carrying an armor is an essential element, whether it protects people or vehicles, for which excessive weight is an obstacle to moving fast and limits their range of action.

Systems are known, in particular those formed by the so-called "mosaic" assembly of ceramic parts having a certain polygonal shape and individually resistant to the impact of a projectile. JP 2005247622 describes for example an arrangement of such shapes that are 20 to 100 mm wide, with a thickness of a few mm. This type of mosaic of parts has the advantage of resisting successive shots (multi-shot or multi-hit protection).

There are other so-called monolithic systems, i.e. formed by a single part or even by a very limited number of large surface parts, each monolith having an impact surface of more than 100 cm$^2$, so as to reduce the number of seams.

Many materials have been proposed to constitute personal armor, which must have a low armor weight to protective surface ratio, typically less than 50 kg/m$^2$, or non-personal armor for vehicles or fixed installations, the weight to protective surface ratio (or surface density) of which is typically greater than 50 kg/m$^2$ but preferably less than 150 kg/m$^2$.

Metals are commonly used as armor but they have high surface density.

More recently, products based on non-oxide ceramics have been proposed with a lower weight to protective surface or surface density ratio for equivalent impact resistance.

For example, U.S. Pat. Nos. 4,604,249 or 4,415,632 disclose products made of porous silicon carbide (SiC) that can be used as armor, obtained by sintering and then impregnated with metal. Other patents, such as, for example, U.S. Pat. Nos. 6,609,452 B1 or 6,862,970 B2, have proposed other armor solutions comprising SiC grains bonded by a metallic silicon phase. However, the ballistic performance of this type of composite, with a similar surface density, appeared to be lower than a dense sintered SiC material. A material based on dense SiC sintered without pressure is known for example from U.S. Pat. No. 4,004,934 or even from U.S. Pat. No. 4,179,299. More recently WO2007126784 proposed to further increase the toughness resistance of the SiC material, i.e., its ability to resist the propagation of a crack, by providing additives. WO2013186453A1 proposes modifying the size and shape of the grains, the objective being to achieve a relative density of more than 99%, i.e., a porosity of less than 1%. Despite this level of density, the inventors realized that it was still possible to increase the ballistic performance.

The object of the present invention is therefore to provide a ceramic armor material, preferably sintered without pressure, with improved ballistic performance. In particular, today there is a need for armor capable of resisting perforation and more particularly successive impacts by projectiles with high kinetic energy, while having low bulk density, typically less than 4.0 g/cm$^3$, preferably less than 3.5 g/cm$^3$ or even less than 3.2 g/cm$^3$, in order to protect people or vehicles (land, sea or even air) or even fixed installations, such as buildings.

SUMMARY OF THE INVENTION

According to a first general aspect, the present invention relates to an anti-ballistic armor element, preferably having an impact surface, in particular flat and/or curved, and comprising a ceramic body made of a material qualified as hard. The ceramic body is generally provided on its inner face or opposite the impact face with a rear energy-dissipation coating, preferably made of a material of lower hardness than that of the material constituting the ceramic body. More specifically, the present invention relates to an armor or ballistic protection element, comprising a ceramic body comprising, preferably consisting of, a sintered material consisting of ceramic grains with a Vickers hardness of more than 5 GPa, preferably of which at least 95% by number have a diameter of between 1 and 50 micrometers, the total volume of the pores of said material being between 0.5 and 10% of the volume of said material, said ceramic body being characterized in that:

the cumulative volume of pores with a diameter of between 30 and 100 micrometers represents between 0.2 and 2.5% of the volume of said material, the cumulative volume of pores with a diameter of more than 100 micrometers is less than 0.2% of the volume of said material, and the remainder of said total pore volume consisting of pores with a diameter of less than 30 micrometers.

According to an essential and advantageous characteristic of the present invention, the ceramic body is slightly porous, which is favorable to lightening the armor, but it is nevertheless possible to substantially increase its ballistic performance thanks to a very fine control of its porometry. Said control can advantageously be carried out in combination with the control of the grain size of the component material.

Porosity, i.e., total pore volume, and pore diameter can be determined from X-ray microtomography.

The diameter of the grains can be determined from conventional observation of the microstructure of the sintered material through scanning electron microscope images of a cut or polished section of said sintered material produced on at least 500 grains, preferably at least 600 grains, for example on an image of at least 100×100 micrometers, preferably on an image of at least 100×150 micrometers. A porosity of more than 10% by volume has the effect of reducing the ballistic resistance of the armor element. A porosity of less than 0.5% by volume helps to increase its weight to protective surface ratio.

The ceramic body of the armor element according to the invention may have one or more of the following preferred characteristics:

the cumulative volume of pores of said sintered material with a diameter of between 30 and 100 micrometers is greater than 0.3%, preferably greater than 0.5%, preferably greater than 1% and/or less than 2.3%, preferably less than 2%, preferably less than 1.5% of the volume of said material.

the cumulative volume of pores of said sintered material with a diameter of more than 100 micrometers is less than 0.1%, preferably less than 0.05% of the volume of said material.

the cumulative volume of pores of said sintered material with a diameter of less than 30 micrometers lies between 0.5% and 2% of the volume of said material. In particular, the cumulative volume of pores of said sintered material with a diameter of less than 30 micrometers is less than 1.5%, or even less than 1% of the volume of said material.

the cumulative volume of pores of said sintered material with a diameter of more than 80 micrometers is less than 0.8%, preferably less than 0.5% of the volume of said material.

the cumulative volume of pores of said sintered material with a diameter of between 40 and 80 micrometers is greater than 0.5 and/or less than 1.5% of the volume of said material.

the cumulative volume of pores of said sintered material of less than 40 micrometers is less than 1.5%, preferably less than 1%, by volume of said material.

the distribution by volume according to the diameter of the pores of said sintered material is multimodal, preferably bimodal, and comprises at least a first peak whose maximum is comprised in a range of pore diameters comprised between 0.1 and 15 micrometers and a second peak whose maximum is comprised in a pore diameter range of between 40 and 80 micrometers.

said first peak has a maximum of between 0.5 and 10 micrometers, preferably between 0.5 and 5 micrometers.

said second peak has a maximum of more than 45 micrometers, more than or equal to 50 micrometers, and/or less than 60 micrometers.

the ratio between the maximum of said second peak and that of said first peak of the bimodal pore distribution is greater than 3, preferably greater than 5 and/or less than 20, preferably less than 15.

According to a particularly advantageous embodiment, at least 70% by volume, preferably at least 80% by volume, of the pores of said sintered material with a diameter of more than 30 micrometers have a sphericity greater than 0.8. This particularly favorable characteristic shows the non-agglomeration of the macropores, illustrating the homogeneity of their dispersion.

According to another possible embodiment, at least 70% by volume, preferably at least 80% by volume, of the pores of said sintered material with a diameter of more than 30 micrometers have a sphericity of less than 0.5. In particular, the use of a needle-shaped porogen, for example organic fiber, can prove to be very advantageous for thin armor elements and/or impact face elements having a curved surface, the greater pore length preferably being perpendicular to the impact face.

the total pore volume of said sintered material is between 0.5 and 5% of the volume of said material, preferably between 1 and 4% of said volume, in particular between 1 and 3% of said volume.

the ceramic grains constituting said sintered material are chosen from alumina grains, silicon carbide grains, boron carbide grains, or grains comprising a boride, in particular and for example calcium hexaboride.

According to one possible embodiment, said sintered material consists essentially of grains of non-oxide material, preferably silicon carbide, apart from impurities and/or residual phases in the form of metals, metalloids or oxides. Preferably, the SiC content of the grains is greater than 95% by weight. Preferably the crystal structure of the silicon carbide grains is alpha ($\alpha$).

at least 95% by number of the ceramic grains constituting said sintered material have a diameter of more than 2 micrometers and/or less than 30 micrometers, preferably less than 20 micrometers, more preferably less than 15 or even less than 10 micrometers.

The median diameter of the ceramic grains, in number, of the material lies between 1 and 20 micrometers, preferably between 2 and 10 micrometers.

According to one possible embodiment, said sintered material consists essentially of grains of non-oxide material, preferably silicon carbide, apart from impurities and/or residual phases in the form of metals, metalloids or oxides. Preferably, the SiC content of the grains is greater than 95% by weight.

Preferably the crystal structure of the silicon carbide grains is alpha ($\alpha$).

According to one possible embodiment, the sintered material consists essentially of grains of non-oxide material, preferably silicon carbide, and comprises by weight less than 3% of elemental oxygen, between 0.5 and 4% of other elements chosen from free C, B, Ti, Al, Y, Zr used as sintering additives, the remainder being unavoidable impurities, in particular those chosen from Fe, free Si, Mo, alkalis and alkaline-earth metals. Preferably, the free carbon content is less than 1.5%, more preferably less than 1% by weight of said material.

According to one possible embodiment, the sintered material consists essentially of oxide grains, preferably of alumina, and comprises by weight between 0.5 and 4% of other elements chosen from, B, Ba, Ca, Mg, Si, Ti, Y, Zr used in various forms, for example in the form of an oxide, as sintering additives, the remainder being unavoidable impurities, in particular those chosen from alkalis, alkaline-earth metals and Fe oxides.

According to one possible embodiment, said ceramic body is monolithic, or made up of a single piece of said sintered material, with an impact surface of more than 100 cm$^2$, and/or with a thickness of more than 3 mm. Preferably, said ceramic body has an impact surface of more than 150 cm$^2$, of more than 500 cm$^2$, or even of more than 1000 cm$^2$, said ceramic body has a thickness of more than 4 mm, more preferably of more than 5 mm and/or less than 50 mm, preferably less than 30 mm.

Said ceramic body is monolithic and has an impact surface of more than 2 cm$^2$ and a thickness of more than 3 mm.

according to another possible embodiment, said body comprises an assembly of polygonal parts of which at least 50%, preferably more than 80% by number, have a thickness of more than 3 mm and a surface of more than 2 cm$^2$, consisting of said sintered material. The polygonal parts can have one or more planar or curved impact surfaces.

Said ceramic body may have a flat surface or a surface with one or more curvatures. The ceramic body can be a simple or complex shape, solid or having a cavity, such as for example a tube. Preferably, the ceramic body is chosen from a plate, a breastplate, a helmet, a vehicle bodywork element, a tube.

The weight to surface or surface density ratio of said ceramic body, measured in kg/m², is less than 100, preferably less than 50.

The anti-ballistic armor element has an impact surface, in particular flat and/or curved, comprising a ceramic body comprising, preferably consisting of, a hard material as described above, provided on its inner face or the face opposite the impact face with a rear energy dissipation coating, preferably made of a material of lower hardness than that of the material that constitutes the ceramic body.

The material that constitutes the rear coating is chosen from polyethylenes (PE), in particular ultra high density polyethylenes (UHMPE), glass or carbon fibers, aramids, metals such as aluminum, titanium or their alloys, or steel.

The ceramic body-back coating assembly is surrounded by an envelope of a containing material.

the material constituting the envelope is chosen from polyethylenes (PE), in particular ultra-high density polyethylenes (UHMPE), glass or carbon fibers, aramids, metals such as aluminum or steel.

The invention also relates to the use of an armor element comprising a ceramic body having the characteristics described above as antiballistic protection for a person or a land, sea or air vehicle or of a fixed installation such as a building, an enclosure wall, or a guardhouse, in particular in the form of a plate, a tile, a mosaic, for example in the form of hexagons or nodules, of a breastplate, of a shield, of a helmet, of a bodywork element of a vehicle such as a door, of a seat, of a tube.

For the sake of conciseness, we shall not repeat here all of the technical characteristics already described above in relation to the armor plate, and it will be understood that a ceramic body according to the invention naturally covers all of the preferred embodiments.

DEFINITIONS

The following indications and definitions are given, in relation to the preceding description of the present invention:

Pore diameter and pore volume can be determined by microtomography, in particular by X-ray microtomography. For example, a sample volume of more than 15 mm³ is scanned in a nanofocus tomograph so as to bring the sample as close as possible to the source and thus obtain a high resolution of the order of 0.3 to 3 µm³/voxel. The resolution can be adapted to the population of pores studied. An acquisition time of approximately 3 hours makes it possible to obtain a reconstruction with little noise. The volume image obtained, consisting of different levels of gray, is binarized, for example using IMorph software, in order to make out the pores, the grains, or even other phases present such as for example a possible metallic phase.

It is thus possible to deduce therefrom a distribution in volume or in cumulative number or not of pores as a function of their diameter, said pore diameter corresponding to that of a sphere 10 of the same volume as that of said pore. By integration, it is possible to measure the volume or the total number of pores of said material.

The term "multimodal pore distribution" means the fact that the distribution spectrum has several individualizable maxima, each maximum corresponding to a maximum of the pore volume distribution curve in a given interval of pore diameters.

Within the meaning of the present description and unless otherwise stated, the median pore diameter designates the pore diameter below which lies 50% by volume of the pore population.

The diameter of the grains is determined from conventional observations of the microstructure of the sintered ceramic material using SEM (scanning electron microscopy) images on a section of a sample of the sintered product comprising a sufficient number of grains, in particular at least 500 grains, or even at least 600 grains, preferably after etching to reveal the grains and their joints, the etching with Murakami's reagent consisting in immersing the polished sample for 15 minutes in a mixture of potassium ferricyanide and potassium hydroxide in water that is brought to boiling. The grain diameter thus measured (also called equivalent grain diameter in the literature) corresponds to the diameter of a disk with a surface equivalent to that of said grain, as observed in two dimensions on the SEM image.

It is possible to determine from the grain diameter distribution the percentage of grains, in number, with a diameter between 1 and 50 micrometers, the median grain diameter (or percentile $D_{50}$), i.e., the diameter dividing the grains into first and second populations that are equal in number, these first and second populations comprising only grains having a diameter of more than, or less than, the median diameter, respectively. It is likewise possible to determine the 10 ($D_{10}$) or 90 ($D_{90}$) percentiles of a distribution of grains of said material according to the invention corresponding respectively to the percentages, in number, of 10% or 90% on the curve of cumulative distribution of grain diameters classified in ascending order. For example, 10% by number of the grains have a diameter of less than $D_{10}$ and 90% of the particles by number have a size of more than $D_{10}$.

the porosity of the sintered material, i.e., the total volume of its pores, can be calculated by integrating the volumes of all the pores measured by microtomography.

By sphericity of a pore or a particle we mean the ratio between the surface of a sphere of a diameter corresponding to the diameter of said pore or said particle and the inner surface of said pore or the outer surface of said particle. A perfect sphericity is therefore equal to 1. A pore or a particle is all the more elongated as its sphericity is much less than 1.

By apparent density of a ceramic body we mean within the meaning of the present invention the ratio equal to the weight of the product divided by the volume occupied by said product.

The identification and the chemical composition of the grains can also be carried out by techniques such as backscattered electron analysis using a scanning electron microscope or even by energy dispersive X-ray spectroscopy (EDS).

The Vickers hardness of the grains can be measured using a standard diamond pyramidal tip with a square base and a vertex angle between the faces of 136°. The imprint made on the grain therefore has the shape of a square; the two diagonals d1 and d2 of this square are measured using an optical device. The hardness is calculated from the force applied to the diamond tip and the average d value of $d_1$ and $d_2$ according to the following formula:

$$H_V = 0{,}189 \cdot \frac{F}{d^2} \text{ with } \begin{array}{l} H_V = \text{Vickers hardness} \\ F = \text{Force applied [N]} \\ d = \text{Average of indentation diagonais [mm]} \end{array}$$

The strength and duration of the indentation are also standard. The reference standard for ceramic or cermet materials is ASTM C1327:03 "Standard Test Method for VICKERS Indentation Hardness of Advanced Ceramics".

During sintering, the temperature being high, the grains can grow significantly compared to the size they had in the starting filler. In the sintered ceramic body, the grains represent substantially 100% of the weight of the product. The sintered material can be sintered in the solid phase or in the liquid phase. Unlike so-called liquid-phase sintering, the process for firing the material according to the invention is preferably carried out in the solid phase, i.e., sintering in which none of the sintering additives added, or even the phases formed from the combination of certain of these additives, or even any impurities of the product to be sintered, are likely to form a liquid phase in an amount sufficient to allow rearrangement of the grains and thus bringing them into contact with one another. This is particularly the case when no liquid phase is created during sintering. A material obtained by solid phase sintering is commonly referred to as a "solid phase sinter".

Sintering additive, often more simply called "additive" in the present description, means a compound usually known to allow and/or accelerate the kinetics of the sintering reaction.

The elementary chemical contents of the sintered material or of the powders used in the mixture of the process for manufacturing said material are measured according to techniques that are well known in the art. In particular, the contents of elements such as Al, B, Ti, Zr, alkali metals and alkaline-earth metals in particular can be measured by X-ray fluorescence or even by ICP depending on the contents to be measured. SiC content and free carbon and oxygen content can be measured by LECO. The content of free Si or the metallic phase of silicon can be determined by X-ray diffraction. The free carbon content of the sintered material of silicon and/or boron carbide is calculated by the difference between the total carbon content measured by LECO and the carbon content bound in the form of carbides, in particular silicon and boron including the SiC, B4C, even CW phases quantified by X-ray diffraction.

The median diameter of the particles (or the median "size") of the particles constituting a powder is given within the meaning of the present invention by characterizing the particle size distribution, in particular by means of a laser particle sizer. The characterization of particle size distribution is conventionally carried out with a laser particle sizer in accordance with standard ISO 13320-1. The laser particle sizer can be, for example, a Partica LA-950 from the company HORIBA. Within the meaning of the present description and unless otherwise stated, the median diameter of the particles designates respectively the diameter of the particles below which there is 50% by weight of the population. We call "median diameter" or "median size" of a set of particles, in particular of a powder, the percentile $D_{50}$, that is to say the size dividing the particles into first and second populations that are equal in volume, these first and second populations comprising only particles having a size of more than, or less than, the median size, respectively.

Unless otherwise indicated, in the present description, all the percentages are percentages by weight.

The armor element according to the invention allows in particular protection against any type of projectile, for example a bullet, a shell, a mine or an element projected by the detonation of explosives, such as bolts, nails (or IED for Improvised Explosive Device) and is normally an element of armor for people or vehicles, usually in the form of modules such as plates.

According to the invention, the protection element comprises at least two layers: a first ceramic part as described previously, associated with another less hard and preferably ductile material on the rear face, conventionally called backing, such as polyethylene fibers (e.g., Tensylon™, Dyneema®, Spectra™), aramid (e.g., Twaron™, Kevlar®), fiberglass, or metals such as steel or aluminum alloys, in the form of plates. Adhesives, for example based on polyurethane or epoxy polymers, are used to bind the various elements constituting the armor plate.

Under the impact of the projectiles, the ceramic body fragments and has the main role of breaking the cores of the projectiles. The role of the backing, associated with the ceramic material constituting the ceramic body, is to expend the kinetic energy of the debris and to maintain a certain level of confinement for the ceramic plate, further optimized by the confinement envelope.

A ceramic body according to the invention can in particular be obtained by a sintering process, in particular a solid or liquid phase sintering process comprising the following steps:
  a) preparation of a starting filler comprising at least one ceramic particle powder, preferably at least one sintering additive powder, and the addition of porogens so as to generate porosity within the ceramic body after sintering, in order to obtain a homogeneous mixture,
  b) shaping of the starting filler in the form of a preform,
  c) sintering of said preform comprising a debinding step in order to vaporize any part of the porogen so as to obtain a product according to the invention.

In such a method, an initial ceramic particle powder, for example silicon carbide, is used, the median particle diameter of which is greater than 0.1 micrometers, preferably greater than 0.3 micrometers, and less than 50 micrometers, of preferably less than 40 micrometers, preferably less than 30 micrometers, preferably less than 20 micrometers, preferably less than 10 micrometers, preferably less than 5 micrometers, and preferably less than 4 micrometers, or even less than 3 micrometers or even less than 1 micrometer. The sintering additive depends on the chemical nature of the ceramic grains. For example, in the case of silicon carbide particles, the sintering additive is preferably chosen from carbon, boron, titanium and zirconium carbides or zirconium and titanium borides, alone or as a mixture. In a particularly preferred embodiment, the product is obtained by a process as described above in which the sintering additive comprises or consists of a mixture of boron carbide and carbon.

A method for manufacturing the sintered material of the ceramic body of the armor element according to the invention may comprise the following steps:
  a) preparation of a starting filler comprising:
    a ceramic particle powder, the median particle diameter of which is between 0.1 and 30 micrometers, preferably at least one sintering additive powder,
a porogen powder chosen from polyethylene; polystyrene; polymethacrylates, polyvinyl chlorides (PVC); cellulose acetate, epoxy or polyimide resins; or derivatives or a mixture thereof, the median particle diameter of which is between 60 and 80 micrometers,
b) shaping of the starting filler in the form of a preform,
c) solid phase sintering of said preform comprising a debinding step in order to vaporize any part of the porogen so as to obtain a product according to the invention.

More detailed information is given below concerning a method for obtaining the sintered material according to the invention: The ceramic particle powder can also be obtained by reducing the size of a coarser initial powder. This reduction in size is generally carried out by grinding according to techniques known to those skilled in the art, such as for example a ball mill, a jar mill, with ceramic beads preferably of the same chemical composition as the ceramic grains.

Preferably, the median size of the ceramic particle powder, after optional grinding, is less than 5 micrometers, preferably less than 4 micrometers, preferably less than 3 micrometers, preferably less than 2 micrometers, preferably less than 1.5 micrometers.

Preferably, in the case of a silicon carbide powder, this has an oxygen element content of less than 2%, preferably less than 1.6%, preferably less than 1.4%, preferably less than 1.2%, preferably less than 1%, or even less than 0.7%, or even less than 0.5%, or even less than 0.3% by weight. In one embodiment, the oxygen element content of the silicon carbide powder can be reduced before use by any technique known to those skilled in the art, such as acid washing, for example.

The amount of solid phase sintering additives is preferably between 0.1% and 6% by weight of the starting mineral filler, that is to say the ceramic grains and sintering additives powder(s). The porogens and shaping additives intended to be vaporized during drying or debinding are not part of the starting mineral filler In the case of a sintered material of silicon carbide, the solid phase sintering additives can preferably be chosen from compounds comprising the elements boron, titanium, zirconium and carbon, such as carbides, such as $B_4C$, TiC, borides, such as ZrB2, TiB2, as well as precursors of said compounds, and/or precursors of free carbon, such as a phenolic resin.

In a particularly preferred embodiment, the solid phase sintering additives used are a mixture of boron carbide $B_4C$ and carbonaceous resin, the amount of $B_4C$ being more than 0.1%, preferably more than 0.2% and less than 0.7% by weight of the starting mineral filler and the quantity of carbon provided by the carbonaceous resin is more than 0.1%, preferably more than 0.3%, more preferably more than 0.6% and less than 3%, preferably less than 2% by weight of the starting mineral filler.

In another possible embodiment, the solid phase sintering additive used is B4C in an amount of more than 0.1%, preferably more than 0.2% and less than 0.7%, preferably less than 0 6%, or even less than 0.5%, or even less than 0.4% by weight of the starting filler and the elemental oxygen content of the silicon carbide powder of the starting filler is less than 0.3%. In another possible embodiment, the solid phase sintering additive used is carbon in an amount of more than 0.1%, preferably more than 0.3%, more preferably more than 0.6% and less than 3%, preferably less than 2%, preferably less than 1.5%, or even less than 1%, or even less than 0.8% by weight of the starting filler. In one embodiment, the starting stock contains a binder and/or a lubricant and/or a surfactant. In one embodiment, the weight of binder and/or a lubricant and/or a surfactant represents between 5 and 15% of the weight of starting mineral filler.

The mixture contains at least one porogen which is vaporized during sintering. Preferably, the blowing agents are chosen from polyethylene; polystyrene; polymethacrylates, polyvinyl chlorides (PVC); cellulose acetates, epoxy or polyimide resins; or derivatives or a mixture thereof. The porogens are provided in the form of particles whose diameter is preferably between 40 and 120 micrometers, preferably between 50 and 100 micrometers, depending on the density of the porogen used.

According to one possible embodiment, in the case of a sintered material of silicon carbide, the pore-forming agent is preferably in the form of a powder which has a median particle size $D_{50}$ of between 60 and 80 micrometers. Preferably the ratio $(D_{90}-D_{10})/D_{50}$ so is less than 0.65, preferably less than 0.5, or even less than 0.4 or even less than 0.3. The quantity of porogen agent is less than 3% by weight of the starting mineral filler. According to one possible embodiment, the particles are beads or spheres. According to another possible embodiment, the particles are organic fibers. The powder is preferably a PMMA powder. Mixing is carried out in such a way as to obtain a good homogeneity of distribution of the various elements, the mixing time being able to be adapted to achieve this result.

Preferably, the mixing is carried out in a jar mill, the mixing time is of more than 15 hours. A mixing time of 24 hours is well suited. When the mixture is obtained, it can be atomized or granulated, for example by freeze granulation, in order to obtain granules preferably with a median diameter of between 50 and 150 micrometers which will be shaped, for example by pressing, in order to get a ceramic preform. Other shaping techniques can be used, such as injection or slip casting.

After shaping, the preform can also be machined. Shaping can be done by casting, pressing, extrusion or injection molding.

The preform is then sintered. The sintering can be carried out with or without pressure applied to the preform during sintering. Hot pressing, hot isostatic pressing or SPS (Spark Plasma Sintering) techniques are particularly suitable. The sintering temperature is above 1700° C., preferably above 1800° C., preferably above 1850° C., or even above 1950° C. and below 2300° C., or even below 2200° C. The process comprises, according to technology that is well known to those skilled in the art, a debinding step before or during the sintering step. This step, which makes it possible to vaporize the shaping additives and the porogens, is typically carried out at a temperature below 1000° C. The temperature and duration of the debinding depends on the nature of the porogen and the binders, but also on the load of the furnace in which the debinding operation is carried out.

If a pressure is applied during sintering, this pressure is higher than 10 MPa, preferably higher than 20 MPa, preferably higher than 35 MPa and lower than 500 MPa, preferably lower than 300 MPa, even lower than 200 MPa, even lower than 100 MPa, or even lower than 75 MPa, or even lower than 55 MPa.

The holding time during high temperature sintering can be zero, in particular during SPS sintering. Preferably, this holding time is more than 0.5 minutes, preferably more than 1 minute, preferably more than 2 minutes, preferably more than 4 minutes and less than 120 minutes, or even less than 90 minutes, less than 60 minutes, preferably less than 30 minutes, preferably less than 20 minutes, preferably less than 10 minutes, preferably less than 6 minutes. A sintering time equal to 5 minutes is well suited. The ramp to the maximum temperature is preferably more than 10° C./min, or even more than 30° C./min, or even more than 50° C./min, or even more than 100° C./min.

The firing takes place under a controlled non-oxidizing atmosphere, preferably under vacuum or under argon or under nitrogen.

FIGURES

Figure 4:
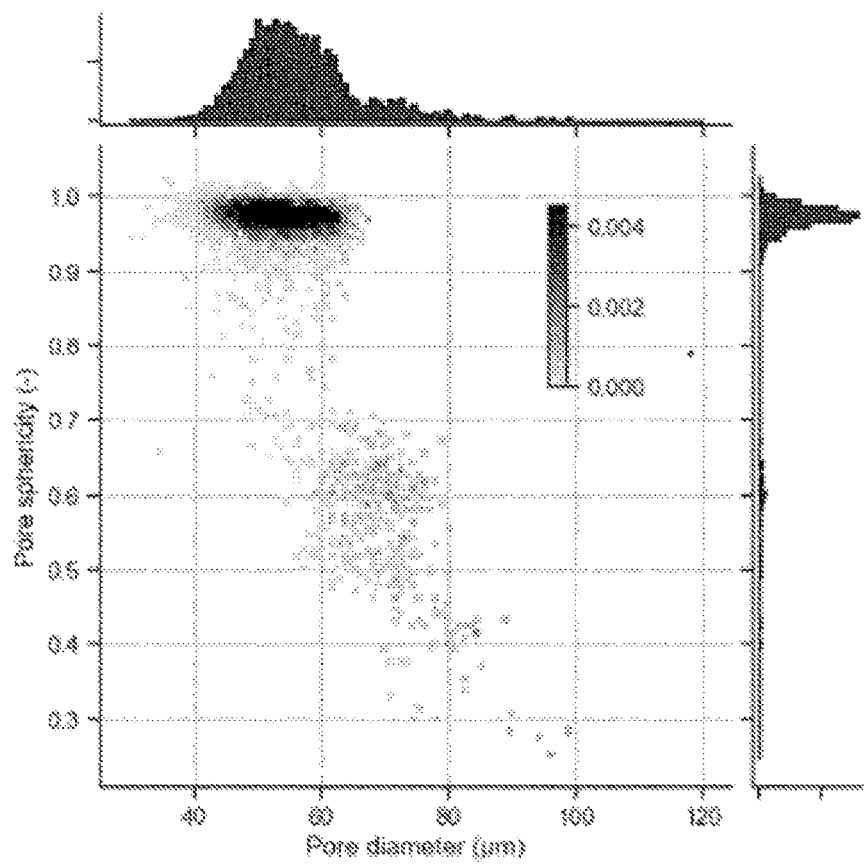

FIGS. 4 and 5 show the volume distribution of the sphericity of the pores as a function of their median diameter in micrometers, measured by tomography according to the technique explained above, for example 2 (according to the invention) and for example 3 (comparative), respectively.

The examples which follow are given purely by way of illustration and do not limit the scope of the present invention under any of the aspects described.

EXAMPLES

In all the following examples, ceramic bodies in the form of plates, of 100 mm×100 mm format and 7 to 10 mm thickness, were initially produced by pressing a mixture of atomized powders. The shaping mixture of example 1 (comparative) was made in the same way as described in example 1 of US 5589428. That of example 2 (according to the invention) differs in that the PMMA powder used has a substantially narrower diameter distribution. Example 3 (comparative) differs from example 1 in that its median porogen diameter is larger. Example 4 (comparative), unlike the previous examples, does not contain added porogen in the form of PMMA beads.

The formulations of the various examples have been reported in Table 1 below.

TABLE 1

| % by weight | Example 1 (comparative) | Example 2 (invention) | Example 3 (comparative) | Example 4 (comparative) |
|---|---|---|---|---|
| Green SiC powder −325 mesh Norton SIKA ground to 0.45 µm | 94.78 | 94.78 | 94.78 | 94.78 |
| B4C powder Norbide Boron Carbide ® $D_{50}$ = 3.6 µm | 0.66 | 0.66 | 0.66 | 0.66 |
| Occidental Chemical Company's Plyophen 43290 phenolic resin comprising 42.5% coke by weight | 4.56 | 4.56 | 4.56 | 4.56 |
| total mineral filler % | 100 | 100 | 100 | 100 |
| Addition of porogen % | +2.84% PMMA beads | +0.75% PMMA beads | +1.70% PMMA beads | No PMMA beads |
| $D_{10}$ (µm) | 53 | 63 | 62 | |
| $D_{50}$ (µm) | 70 | 70 | 85 | |
| $D_{90}$ (µm) | 110 | 75 | 118 | |
| (D90 − D10)/D50 | 0.81 | 0.17 | 0.65 | |
| additions % relative to the weight of mineral filler Binder + dispersant added | +9.00% | +9.00% | +9.00% | +9.00% |

The ceramic bodies were shaped by casting.

The parts were removed from the mold and then dried for 24 hours at 110° C. before firing under argon at 2150° C. for 1.5 hours. The characteristics of the ceramic body and the composition of the various materials constituting it are shown for each embodiment in Table 2.

The pore diameter and volume were determined by X-ray tomography using the INSA Lyon CT scanner on the basis of 3 mm*3 mm*4 mm samples. The resolution was adapted to the diameter of pores observed, typically 3 µm/voxel for pores with a diameter of more than 30 micrometers and 0.3 µm/voxel for pores with a diameter of less than 30 micrometers in order to constitute a volume distribution diagram of pores and calculate the cumulative pore volumes. The volume percentage of pores with a diameter of more than 30 µm whose sphericity is greater than 0.8 was calculated from the curves shown in FIGS. 4 and 5.

The (equivalent) diameters of the grains could be determined from scanning electron microscope images of a polished section of said sintered material treated with Murakami reagent on an image of 100×150 micrometers, from which 700 grains were counted.

The free or residual carbon and boron contents were measured respectively by LECO and ICP. The crystallographic form aof SiC present was determined by X-ray diffraction analysis.

TABLE 2

|  | Example 1 (comparative) | Example 2 (invention) | Example 3 (comparative) | Example 4 (comparative) |
| --- | --- | --- | --- | --- |
| Characteristics body/ceramic material after firing Microstructural characteristics | | | | |
| Vickers hardness of the grains of sintered material (GPa) Measured according to ASTM C1327:03 | >10 | | | |
| apparent density g/cm³ according to ISO 18754 | 3.00 | 3.12 | 3.04 | 3.15 |
| Measurements made by X-ray tomography and interpreted by 3D image analysis | | | | |
| % by number of grains of diameter between 1 and 50 μm | >95% | | | |
| Median grain diameter in number of the material (μm) | N/M | 3.9 | 4.1 | 4.0 |
| D10 of grains in number of the material (μm) | N/M | 2.2 | 2.3 | 2.1 |
| D90 of grains in number of the material (μm) | N/M | 6.6 | 6.5 | 6.4 |
| Porosity or total pore volume % | 7.5 | 2.3 | 4.5 | 1.2 |
| cumulative pore volume <30 μm (vol %) | N/M | 0.95 | 1.3 | 1.2 |
| cumulative volume of pores between 30 and 100 μm (vol %) | N/M | 1.3 | 2.9 | <0.1 |
| cumulative volume of pores >100 μm (vol %) | N/M | <0.05 | 0.3 | <0.1 |
| cumulative pore volume <40 μm (vol %) | N/M | 0.95 | 1.3 | 1.2 |
| cumulative volume of pores between 40 and 80 μm (vol %) | N/M | 1.2 | 2.0 | <0.1 |
| cumulative volume of pores >80 μm (vol %) | N/M | 0.05 | 1.1 | <0.1 |
| Median pore diameter ($D_{50}$) (μm) | 70 | 48 | 62 | <5 |
| Maximum of 1st pore peak (μm) | N/M | <5 | <5 | <5 |
| Maximum of 2nd pore peak (μm) | N/M | 55 | 60 | None |
| Average sphericity | N/M | 0.94 | 0.88 | N/M |
| Volume percentage of pores with a diameter of more than 30 micrometers whose sphericity is greater than 0.8 | N/M | 84% | 66% | N/A |
| chemical composition (% by weight) | | | | |
| Silicon carbide SiC (LECO) | >98 | >98 | >98 | >98 |
| B (ICP) | <1 | <1 | <1 | <1 |
| Free carbon (LECO) | <1 | <1 | <1 | <1 |

N/M = not measured; N/A = not applicable

For each example, eight ceramic plates obtained according to the process described above with a surface density of 21.2 Kg/m² (±0.5 Kg/m²) were bonded to 200 mm×200 mm×5 mm metal plates of aluminum 7020 T6.
Areal density $\rho_a$ is calculated according to the following formula $$\rho_a = t \times \rho_v$$

where:
$\rho_a$ is the surface density expressed in Kg/m²
t is the thickness of the plate, expressed in mm
$\rho_v$ is the apparent density expressed in Kg/dm³ typically measured according to standard ISO 18754.

Each ceramic-metal assembly was exposed to a shot from a distance of 15 meters with a 7.62×51 mm P80 ammunition (armor-piercing ammunition with steel core) at different impact speeds. A graph representing the status of the perforation (protection or complete perforation) as a function of the impact speed was established for each example. From this graph, the median velocity V50 from which the probability of perforation is 50% is determined for each example. A velocity of more than 700 m/s taking into account this type of ammunition is considered satisfactory. A high velocity corresponds to a ballistic performance that is higher the lower the surface density. The ballistic properties of the final armor plate are gathered in the following Table 3:

TABLE 3

|  | Example 1 (comparative) | Example 2 (invention) | Example 3 (comparative) | Example 4 (comparative) |
| --- | --- | --- | --- | --- |
| Ballistic tests | | | | |
| Median velocity $V_{50}$ (m/s) for a surface density of 21.2 kg/dm² | 721 | 789 | 765 | 752 |

The results grouped together in Table 3 indicate that the choice of material used to manufacture an armor element leads to a better $V_{50}$ velocity than the comparative examples. A plate of Example 2 according to the invention was glued using an epoxy adhesive onto a layer of fiberglass connecting it with a polyethylene (UHMWPE) plate. The assembly is wrapped in a layer of Kevlar fabric also bonded with an epoxy resin to form an armor element. A second armor element was also made in the same way but with a plate according to Example 4 (comparative). The multi-impact ballistic performance was evaluated following successive firings of 7.62×51 mm P80 ammunition. Three shots were made on each piece of armor. The results are reported in Table 4.

TABLE 4

|  | example 2 invention | comparative example 4 |
| --- | --- | --- |
| thickness (mm) | 8.5 | |
| Plate shape | flat | |
| surface (cm²) | 670 | |
| Characteristics of backing | Fiberglass + high density PE Thickness: 17 mm | |

TABLE 4-continued

|  | example 2 invention | comparative example 4 |
|---|---|---|
| Characteristics of containment envelope | Aramid fibers (Kevlar ®) | |
| weight/surface ratio (Kg/m$^2$) | 42 +/− 0.5 | |
| Visual observation after firing | no perforation | no perforation |
| Observation | No crack connecting impact holes | Presence of cracks connecting impact holes Sign of weakening after several impacts |

Figure 1:
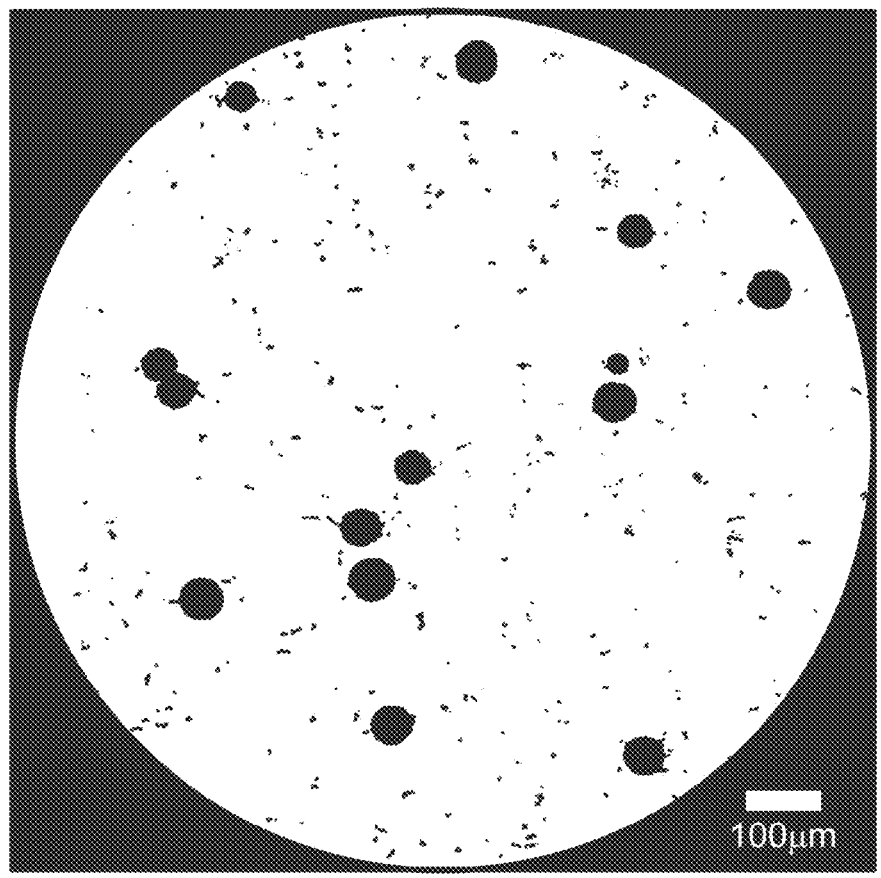
FIG. 1 is an image taken under a scanning microscope of a polished section of the sintered material of the ceramic body of example 2 according to the invention.
Figure 2:
FIGS. 2 and 3 show the fracturing diagram of armor elements, respectively, of Example 4 (comparative) and Example 2 (according to the invention) following successive firings of 7.62×51 mm P80 ammunition as described in the examples.
Figure 3:
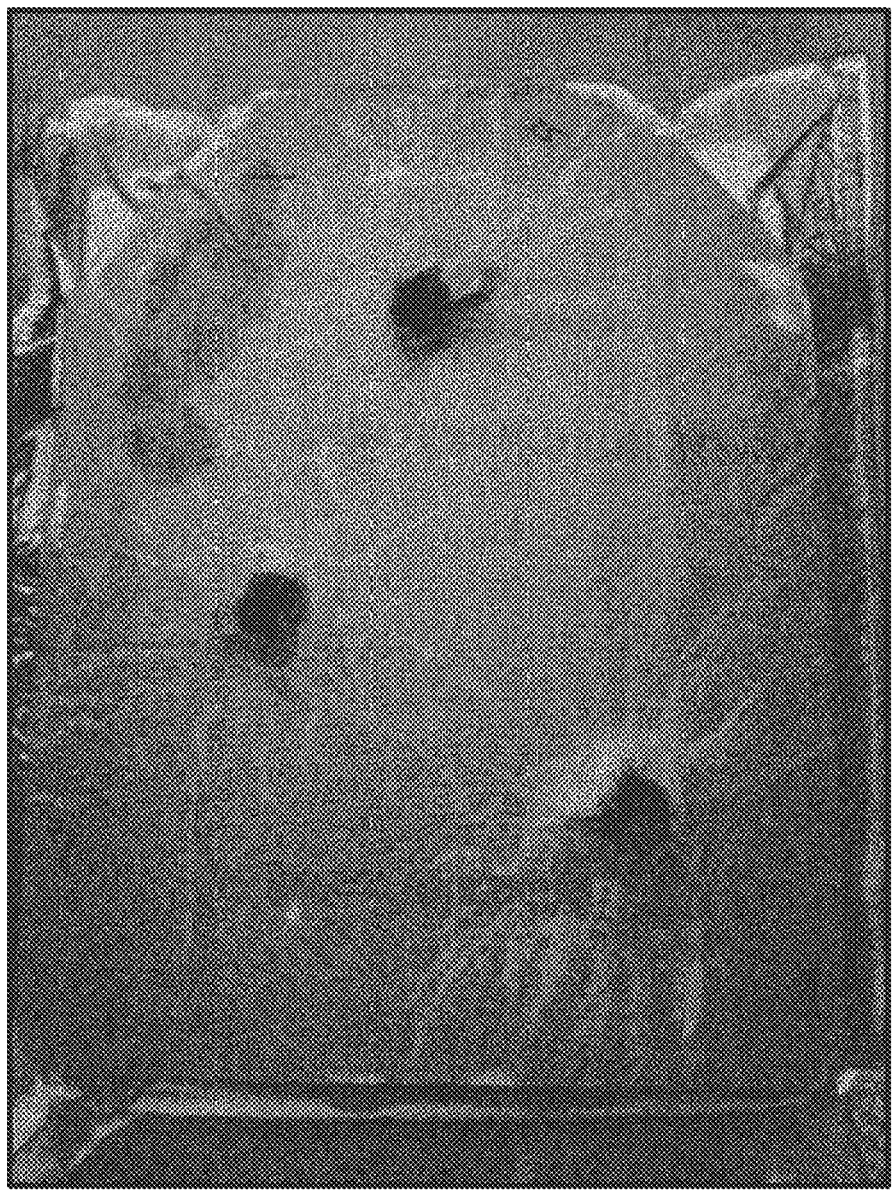

The results of these tests are also illustrated by FIGS. 2 and 3, corresponding respectively to the armor element with a sintered material according to example 4 and according to example 2 according to the invention.

These latter results show that the armor element according to the invention, the ceramic body of sintered material of which has a controlled pore diameter distribution, has improved multi-impact resistance. This is related to the ceramic's ability to 'localize' damage after an impact, leaving a larger healthy (crack-free) area to stop subsequent impacts.

In addition, the comparison of FIGS. 4 and 5 (comparative example) also shows that the example according to the invention (FIG. 4) has a lower proportion of elongated pores among the larger pores, which indicates lower pore agglomeration and consequently a better pore distribution in the material according to the invention.

The invention claimed is:

1. An anti-ballistic armor element, comprising a ceramic body comprising a sintered material consisting of ceramic grains with a Vickers hardness of more than 5 GPa, the total volume of the pores of said material being between 0.5 and 10%, said ceramic body being characterized in that:
   the cumulative volume of pores with a diameter of between 30 and 100 micrometers represents between 0.2 and 2.5% of the volume of said material,
   the cumulative volume of pores with a diameter greater than 100 micrometers is less than 0.2% of the volume of said material,
   the rest of said total pore volume consists of pores with a diameter of less than 30 micrometers; and
   wherein the distribution by volume of the diameter of the pores of said material is multimodal and comprises at least a first peak with a maximum within a range of pore diameters comprised between 0.1 and 15 micrometers and a second peak with a maximum within a pore diameter interval of between 40 and 80 micrometers.

2. An armor element according to claim 1, wherein at least 95% of said ceramic grains have a diameter comprised between 1 and 50 micrometers.

3. An armor element according to claim 1, in which the cumulative volume of the pores of said material of diameter comprised between 30 and 100 micrometers is greater than 0.3% and/or less than 2.3% of the volume of said material.

4. An armor element according to claim 1, in which the cumulative volume of the pores of said material of diameter greater than 80 micrometers is less than 0.8% of the volume of said material.

5. An armor element according to claim 1, in which the cumulative volume of the pores of said material of diameter comprised between 40 and 80 micrometers is greater than 0.5% and/or less than 1.5% of the volume of the said material.

6. An armor element according to claim 1, in which the cumulative volume of the pores of said material of diameter less than 40 micrometers is less than 1.5% of the volume of said material.

7. An armor element according to claim 1, in which the distribution by volume of the diameter of the pores of said material is bimodal.

8. An armor element according to claim 1, in which at least 70% by volume of the pores of said material with a diameter of more than 30 micrometers have a sphericity of more than 0.8.

9. An armor element according to claim 1, in which said ceramic body is monolithic and has an impact surface of more than 2 cm2 and a thickness of more than 3 mm.

10. An armor element according to claim 1, in which the grains of said sintered material are grains of alumina, silicon carbide, boron carbide, or comprise a boride.

11. An armor element according to claim 10, in which the grains are made of silicon carbide, of which at least 95% have a diameter of more than 2 micrometers and/or less than 30 micrometers and have preferably an alpha crystal structure α.

12. An armor element according to claim 1, in which the ceramic body is chosen from among a plate, a breastplate, a helmet, a vehicle bodywork element, a tube.

13. An armor element according to claim 1, comprising a ceramic body comprising a material, provided on its inner face or opposite the impact face with a rear energy dissipation coating, consisting of a material of hardness lower than that of the material constituting the ceramic body, in which the material that constitutes the rear coating is chosen from polyethylenes (PE), in particular ultra-high density polyethylenes (UHMPE), glass or carbon fibers, aramids, metals such as aluminum, titanium or their alloys or steel.

14. An armor element according to claim 13, in which the ceramic body-rear coating assembly is surrounded by an envelope of a confinement material, said material constituting the envelope being chosen from polyethylenes (PE), in particular ultra-high density polyethylenes (UHMPE), glass or carbon fibers, aramids, metals such as aluminum or steel.

15. Method for manufacturing the sintered material of the ceramic body of the armor element according to claim 1, comprising the following steps:
   a) preparation of a starting filler comprising:
      a ceramic particle powder, the median particle diameter of which is between 0.1 and 30 micrometers,
      preferably at least one sintering additive powder,
      a porogen powder chosen from polyethylene; polystyrene; polymethacrylates, polyvinyl chlorides (PVC); cellulose acetate, epoxy or polyimide resins; or derivatives or a mixture thereof, the median particle diameter of which is between 60 and 80 micrometers,
   b) shaping of the starting filler in the form of a preform,
   c) solid phase sintering of said preform comprising a debinding step in order to vaporize any part of the porogen so as to obtain a product according to the invention.

16. Use of the armor element according to claim 1, as ballistic protection of a person or a land, sea or air vehicle, or of a fixed installation such as a building, an enclosure wall, or a guardhouse, in particular in the form of a plate, a tile, a mosaic, for example in the form of hexagons or nodules, of a breastplate, of a shield, of a helmet, of a bodywork element of a vehicle such as a door, a seat, a tube.

17. The method of claim 15, wherein sintering comprises sintering at a temperature above 1700° C.

18. The method of claim 15, wherein sintering comprises sintering at a temperature below 2300° C.

19. The method of claim 15, wherein sintering hot pressing, hot isostatic pressing, or spark plasma sintering.

20. The method of claim 15, wherein sintering comprises applying a pressure above 10 MPa.

* * * * *